March 17, 1942.  R. D. WYCKOFF  2,276,708
SEISMOGRAPH AMPLIFIER
Filed Oct. 2, 1940  3 Sheets-Sheet 1
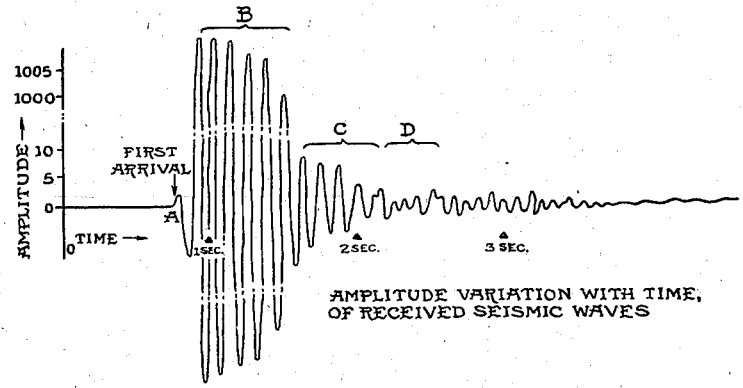
Fig. 1. AMPLITUDE VARIATION WITH TIME, OF RECEIVED SEISMIC WAVES
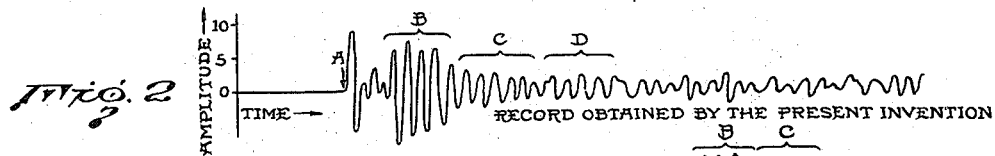
Fig. 2. RECORD OBTAINED BY THE PRESENT INVENTION
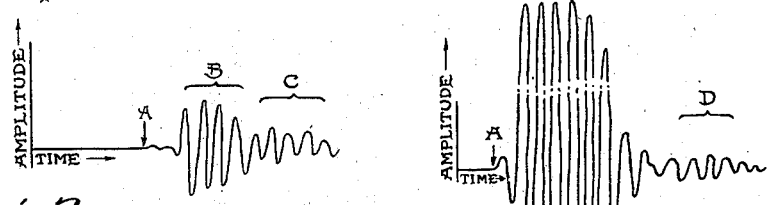
Fig. 3. PRIOR ART
Fig. 4. PRIOR ART
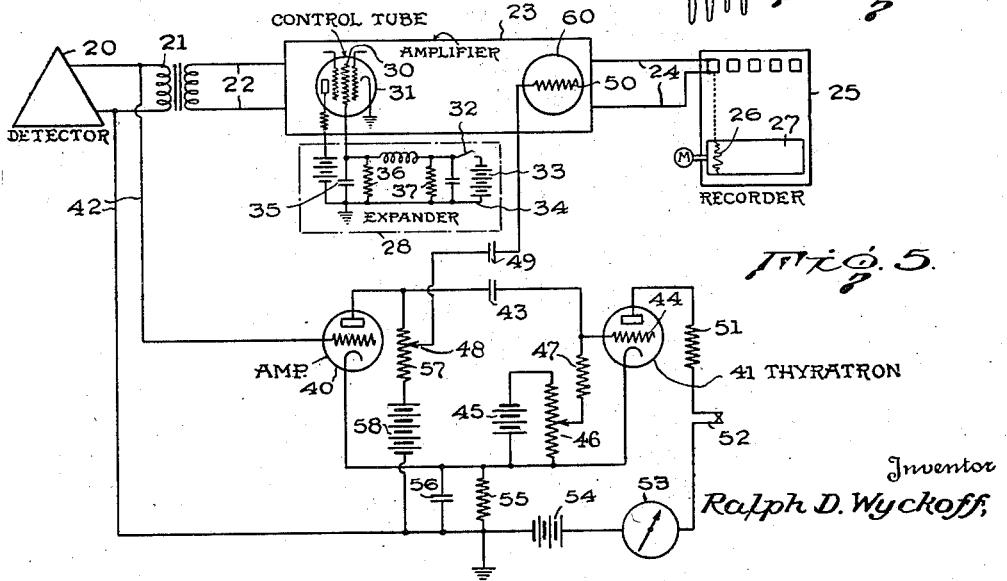
Fig. 5.
Inventor
Ralph D. Wyckoff,
By A. M. Houghton
his Attorney

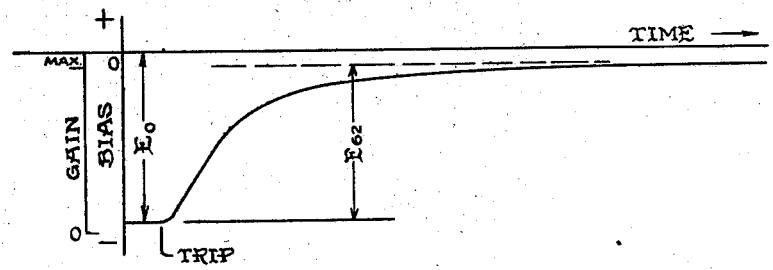
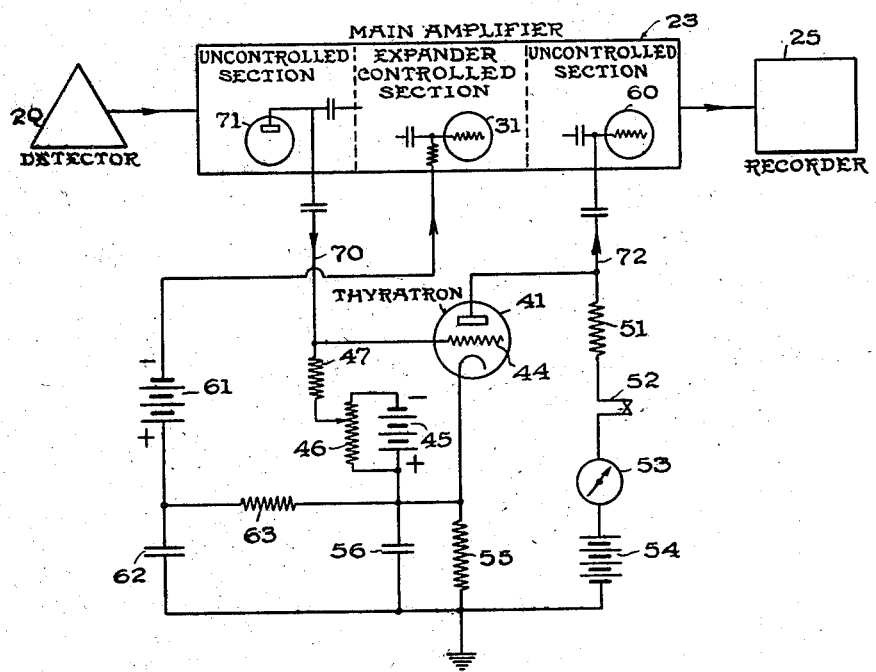

Patented Mar. 17, 1942

2,276,708

UNITED STATES PATENT OFFICE 2,276,708

SEISMOGRAPH AMPLIFIER

Ralph D. Wyckoff, Pittsburgh, Pa., assignor to Gulf Research & Development Company, Pittsburgh, Pa., a corporation of Delaware Application October 2, 1940, Serial No. 359,439

7 Claims. (Cl. 177—352)

This invention or discovery relates to seismograph amplifiers; and it comprises in an electronic seismic signal amplifier having means for progressively increasing the amplifier sensitivity from an initial low value during receipt of seismic waves, the improvement comprising an auxiliary circuit including an auxiliary amplifying device, means for coupling the input and the output thereof to the amplifying circuit at points before and after said sensitivity increasing means respectively, and means for rendering said device inoperative to transmit further signals after transmission of the first signal therethrough; all as more fully hereinafter set forth and as claimed.

In seismograph prospecting seismic waves are generated at some point in the earth, as by exploding a charge of dynamite, and waves are detected at a plurality of points spaced from the earth and are amplified and recorded. The seismic waves in their course through the earth are reflected and refracted at strata interfaces and other subterranean surfaces of discontinuity and these phenomena are revealed in the records in a manner such that the depth and other characteristics of the subterranean rock strata can be measured. In reflection seismography the detectors are placed close enough to the shot to pick up for record primarily the waves reflected from the strata interfaces, etc., as distinguished from refraction seismography wherein the detectors are spaced further away and pick up waves which have coursed along the subterranean interfaces some distance before returning to the earth's surface.

In reflection prospecting, upon firing the shot the phenomena observed at any one of the detector positions are in typical cases as follows: a short quiet period after firing of the shot is broken by a tremor comprising the first arrival energy which has traversed the near-surface material, followed immediately by a series of waves of very high amplitude which represent refraction paths which have penetrated to deeper strata. These high energy wave trains are overlapped and followed by a series of overlapping wave trains of rapidly decaying average amplitude, the whole sequence of waves extending over an interval of a few seconds.

Every part of this sequence of waves is important. The initial tremor, the first wave to reach the detector or "first arrival" should be recorded for its significance in making weathering corrections and the important subsequent wave trains correspond to reflections from deeper and deeper strata interfaces. It is important to note that while the amplitude of the initial wave group may be very large it is the instant of first arrival or first "break" that is important. (Break refers to the very beginning of the first arrival pulse.) Since this time must be determined within one- or two-thousandths of a second, and the first half cycle of the wave train has relatively small amplitude, a rather high sensitivity recording device is required to attain the necessary precision in measuring the first-arrival time.

The usual seismograph system for prospecting work includes a set of electromechanical detectors, an electronic (vacuum tube) amplifier for each detector, and a multi-element oscillograph recorder with a vibratory element for each amplifier arranged to record the detector signals as a set of wavy traces on sensitized paper. Recording the received seismic waves in a manner to enable all possible information to be extracted from each part of the record is a matter of considerable practical difficulty. The amplitudes of the vibrations of interest often extend over a range of 1000:1 or more. That is, the amplitude of the weakest wave of interest may be less than 1/1000 that of the strongest wave. Moreover, in the first part of the record the relatively weak first break is followed immediately by a violent oscillation. It is impossible to record all the waves, on a record of reasonable physical size, without taking some steps to reduce the amplitude of the strongest waves, compared to that of the weakest waves, on the record.

The two expedients which have found the most use in improving seismograph records are the automatic volume control and the expander. In automatic volume control amplifiers the sensitivity or gain of the amplifier is caused to vary in roughly inverse relation to average signal energy over a preceding short interval of time, so that the range of amplitudes on the record is reduced. This apparatus has the disadvantage that the controlling action cannot be made to compensate for abrupt fluctuations in signal energy, without causing disturbances, distortion and other undesirable effects. In particular, such amplifiers cannot be made to record the first arrival at high amplification and then abruptly reduce the amplification sufficiently for a clear record of the high amplitude waves immediately following.

Expanders as the term is employed in the present specification and claims means sensitivity controls which adjust the net sensitivity of the amplifier or recorder independently of signal energy; variation being merely as a function of time. They increase the sensitivity from a relatively low value in the early stages of receipt of the waves from a shot, to a relatively high value in the later stages. The simplest form makes use of a variable resistance somewhere in the amplifier-recorder circuit, which is adjusted gradually from an initial high value to lower values by a motor or by hand during receipt of signals whereby the sensitivity is progressively increased during receipt of signals. More usually the expander makes use of electrical circuits to achieve the desired sensitivity variation. Expanders give a smoother and more regular sensitivity variation than do automatic volume controls, with less distortion of the record. However, expanders suppress the first arrival entirely in many cases, and though expedients have been suggested for causing the expander to produce an initial high sensitivity (for the first arrival) followed by a reduction in sensitivity and then an increase, it has been found practically impossible to adjust the sensitivity quickly enough, in the brief interval between the first arrival and the series of high amplitude vibrations, to provide useful recorded amplitude for each of these events.

In the present invention means are provided for transmitting the first arrival signal to the record independently of the amplifier proper. The sensitivity of the amplifier is adjusted primarily with a view only to proper recording of vibrations later than the first arrival, and the first arrival impulse is sent around the amplifier as it were, and transmitted to the recorder at a readable amplitude. In other words, a bypassing circuit is provided across the main or controlled part of the amplifier and arranged to transmit to the recorder the first arrival only, after which the bypassing circuit goes out of action. In fact the bypassing circuit goes out of action after the first half cycle of the first arrival break or other part of the first cycle of the first arrival break has passed. The invention thus departs from these prior art proposals in that the need is obviated for attempting to vary the sensitivity of the amplifier proper, in the brief interval between the time of the first arrival and the time of arrival of the first strong waves, over a range sufficient for optimum recording of each event.

In the accompanying drawings there are shown diagrammatically several examples of amplifier control circuits within the purview of the invention and charts illustrative of the results obtained by use of these circuits. In the drawings—

Fig. 1 is a generalized chart showing the type of waves received in reflection seismograph prospecting and their variation in amplitude.

Fig. 2 is a reproduction of an oscillograph record of a series of waves as in Fig. 1, obtained by the apparatus of the present invention.

Figs. 3 and 4 show by way of comparison records of a series of waves as in Fig. 1, obtained with conventional expanders and automatic volume control circuits respectively.

Figure 6:
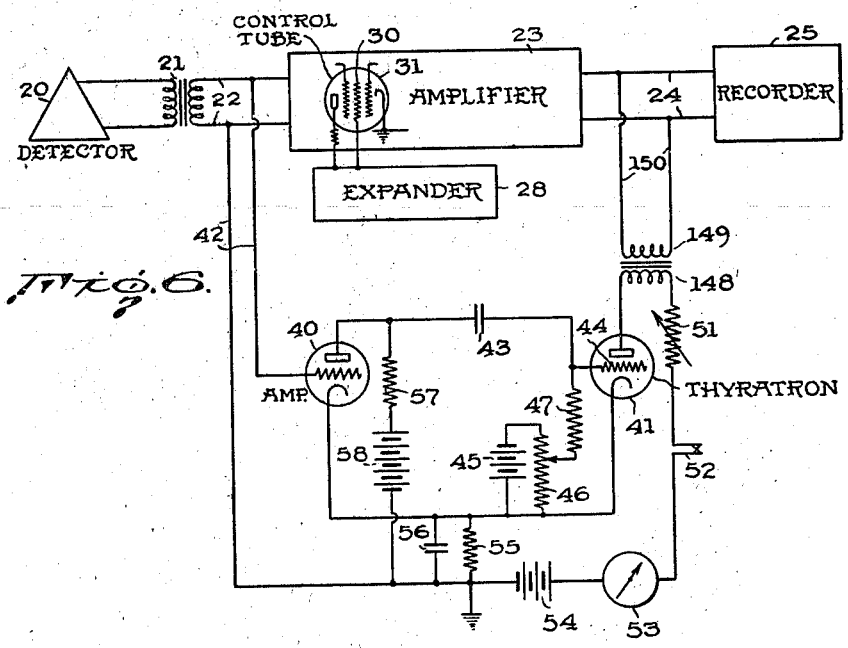
Figure 7:
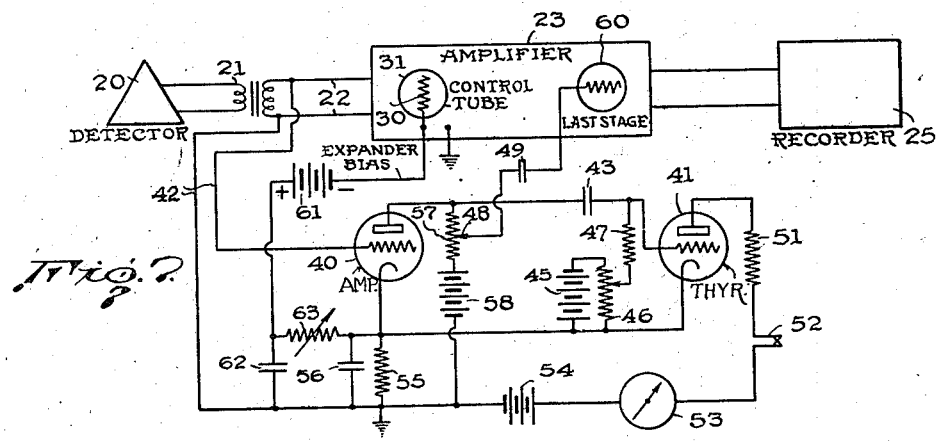

Fig. 5 shows one embodiment of the invention in which the expander circuit and the first arrival amplifying circuit are separate, Fig. 6 shows a modification of the apparatus of Fig. 5, Fig. 7 shows a modification in which the expander circuit and the first arrival amplifying circuit are in part combined, Fig. 8 is a chart showing the change of amplifier gain with time in the apparatus of Fig. 7, and Fig. 9 shows a modification of the invention in which but a single tube is used for the expander and first arrival amplifying circuits.

Referring to the drawings and more especially to Figs. 1 to 4, Fig. 1 shows in a somewhat generalized manner the amplitude of waves as received at seismic detectors in typical reflection seismograph operations. A short time after firing of the shot (at instant zero) the first break A of the very high amplitude first-arrival wave train B is observed. Wave train B is not actually a single train of waves but after the first few cycles is a composite of high amplitude refraction arrivals which in general have followed progressively deeper trajectories but all confined to relatively shallow strata. Their energy may be a thousand times greater than that of later reflected events which arrive as a series of overlapping wave trains C, D, etc., of rapidly decreasing amplitude. It will be clear that if the later events are to be recorded at readable amplitudes the early events would be unrecordable because of excessive amplitudes unless means are provided to reduce all recorded amplitudes to the same order of magnitude by a suitable control device.

Fig. 2 shows how a wave series such as shown in Fig. 1 is recorded by the apparatus of the present invention. The first arrival appears as an unmistakable impulse and the whole series of waves including the first arrival is kept within a moderate amplitude range, say less than 10:1. A few wiggles, quite insignificant, are introduced just after the first arrival, in some embodiments of the invention, due to high frequency components from the auxiliary circuit.

The records obtained with the aid of the apparatus of the invention vary widely in appearance, of course, depending on the terrain being investigated, the relative amplitude range desired by the operator and other factors. Fig. 2 is intended only to be illustrative of a fairly typical sort of record. But in all cases, with proper adjustment and operation, the record shows an unmistakable impulse for the first arrival while the later arrivals are recorded at convenient amplitudes.

Fig. 3 shows for comparison the early portion of a record obtained with a conventional expander. The strong waves B are recorded at useful amplitude but the weak first break is completely suppressed because of the low sensitivity of the receiver at this time. If in lieu of an expander a conventional automatic volume control amplifier is utilized (Fig. 4) the first break is recorded satisfactorily but due to the practical necessity of providing a relatively long delay time in the automatic volume control, the amplitudes of wave trains B, C and other early events are excessive. Any attempt to shorten the time constant to reduce the amplitude of these early arrivals results in serious transient disturbances in the amplifier and the system becomes impractical in operation.

Fig. 5 shows one apparatus embodiment of the invention, in which a conventional expander controlled amplifier is supplemented with a bypass circuit, as it were, operative only for the first arrival. As shown, a seismic detector 20 is connected through a transformer 21 and leads 22 with a conventional main amplifier 23, the output of which is applied by leads 24 to a recorder 25, in which the amplified signal is caused to produce a trace 26 on a moving sheet 27 of sensitized paper. The amplifier sensitivity is controlled by an expander 28 which can be of any suitable type and is shown by way of illustration as including a circuit adapted to apply a gradually decaying negative bias potential to the control grid 30 of one of the amplifier tubes 31. Upon closing a switch 32 the potential of a battery 33 is applied to the grid, thereby reducing the amplifier sensitivity to a low value, and at the same time condensers 34 and 35 are charged from the battery. On opening the switch (which is done at about the instant of firing the shot) the voltage across the condensers gradually drops to zero by discharge of the condensers through resistors 36 and 37, thereby gradually increasing the gain of the amplifier. By suitable adjustment of the magnitude of these circuit elements the rate of increase in gain can be varied at will.

There is provided an auxiliary circuit including an amplifying tube 40 and a relay device shown as a thyratron tube 41. A thyratron is a gas filled tube which is completely non-conductive when the grid bias is sufficiently negative. As the grid bias is reduced (made more positive), at a certain potential the tube trips; plate current suddenly begins to flow. The grid then loses control of the plate current and the discharge can only be stopped by breaking the plate (or filament) circuit. A thyratron tube is a very convenient relay device for my purposes.

Part of the signal energy is diverted from the input of transformer 21 and applied to the grid circuit of tube 40 through leads 42. The output of the amplifier tube is coupled through a condenser 43 to the grid 44 of the thyratron. The grid of this tube is critically biased by a battery 45 and voltage divider 46 connected to the grid as shown through a resistor 47. The plate circuit of the thyratron includes resistor 51 and switch 52, a plate current meter 53, battery 54 and a resistor 55 and a cathode bypass condenser 56 disposed as shown. Resistor 55 affords normal amplifier bias to tube 40 up to the time that current begins to flow in tube 41. The plate circuit of tube 40 is completed through a resistor 57 and battery 58 as shown. Plate current is taken off at a variable tap 48 and applied through a coupling condenser 49 to the grid 50 of the last stage 60 of the amplifier or any other of the amplifier tubes following the volume controlling section (tube 31 of the amplifier). Meter 53 is useful to indicate plate current after tube 41 has been tripped off as described below.

Considering the operation of the device: Tube 41 being critically biased as described, no plate current flows until appearance of the first signal energy at the input of the transformer 21. The portion of the signal corresponding to the first arrival diverted by leads 42 is amplified in tube 40 and the amplified signal is passed to tube 60 and is recorded. The character of the recorded pulse is exhibited at A in Fig. 2.

Provision is made so that once the first arrival has been recorded and has tripped the thyratron, no succeeding waves can pass through tube 40. Thus, the plate current which continues to flow through tube 41 also flows through resistor 55 wherein it creates sufficient bias to block tube 40 completely. Thus the auxiliary circuit described goes out of action immediately after recording of the first break and records no other waves. To restore the apparatus to starting position in preparation for a new operation, switch 52 is momentarily opened to stop the thyratron plate current.

The bypass circuit is shown as taking the signal from input leads 22 but the signal can be taken off at any point in the amplifier before the controlled stage or stages (cf. Fig. 9).

The bypass circuit goes out of action after the first half-cycle of the first arriving pulse has been transmitted to the recorder. There is practically no lag in the recording of the first arrival break. Any lag in the thyratron action is without effect on the time of recording of the initial break of the pulse, since the thyratron merely serves to suppress the action of the amplifier tube 40.

In some cases it is desirable to transmit the first arrival pulse to the recorder from the thyratron rather than from the auxiliary amplifier tube 40. Fig. 6 shows a modification for accomplishing this end. The apparatus of Fig. 6 is like that of Fig. 5 except that the first arrival break is transmitted from the thyratron directly to the recorder. A transformer is provided with its primary 148 in the thyratron plate circuit and its secondary 149 connected by leads 150 in parallel with the recorder leads 24. Fig. 6 also shows the auxiliary amplifier input leads 42 connected to the output of transformer 21 rather than to the input.

In operation, tube 41 being initially critically biased as described in connection with Fig. 5, no plate current flows until appearance of the first signal energy at the output of transformer 21. The portion of the signal corresponding to the first arrival diverted by leads 42 is amplified in tube 40 and the plate current promptly overcomes the bias on grid 44 from battery 45 whereupon plate current abruptly starts flowing through the primary 148. This induces in the secondary a sharp pulse, which is recorded about as indicated at A in Fig. 2. The magnitude of the recorded pulse is determined by the value of resistor 51 which controls the thyratron plate current. Meter 53 exhibits this current.

Once the first arrival pulse has tripped the thyratron and has been recorded, no succeeding waves can pass through tubes 40 and 41, because of the blocking action of the plate current of tube 41 on tube 40 as described in connection with Fig. 5. Thus the auxiliary circuit goes out of action immediately after recording of the first break. Momentarily opening switch 52 restores the apparatus to starting position.

Any time lag in the operation of the apparatus of Fig. 6 is slight and can be practically overcome by adjustment of the normal grid bias of the thyratron close to the critical point.

In the apparatus of Fig. 7 the expander control bias is provided by the auxiliary circuit, the separate expander of Figs. 5 and 6 being omitted. Signals are diverted at 42 from the main signal channel and applied to amplifier tube 40, whence they are applied to tube 41 in a manner similar to that described in connection with Fig. 5. A battery 61 is provided arranged to apply sufficient negative bias to the grid of the control amplifier tube 31 to maintain low sensitivity until the first arrival trips off the thyratron, this tripping action taking place as described in connection with Fig. 5. Tripping the thyratron causes increase in voltage across condensers 56 and 62, which voltage opposes that of battery 61 and decreases the amplifier bias so that the gain increases. However, due to the time required for condenser 62 to charge through resistor 63, the gain increases slowly and smoothly as indicated in Fig. 8. The rate of change is readily controlled by adjustment of resistor 63 and the shape or curvature of the time-sensitivity function can be varied widely by suitable choice of vacuum tubes and the various other circuit elements, especially elements 61, 62, and 63.

In operation, the gain of the main amplifier is initially low before receipt of seismic waves. The first arriving seismic wave energizes amplifier tube 40 thence via coupling condenser 49 and amplifier stage 60, is recorded at a practical amplitude level. The first arrival energy fed from the plate circuit of amplifier tube 40 via condenser 43 to tube 41 also trips the thyratron and squelches tube 40 after a short interval of time as previously described. The tripping of the thyratron simultaneously institutes the gradually increasing gain action as described. The circuit is restored to its original state by opening switch 52. The amplifier tube functions as a blocking device in this circuit.

Fig. 9 shows a circuit requiring but a single tube, a thyratron 41. The circuit is especially adapted for use with amplifiers, of a type common in seismography, in which at least one stage at each end of the amplifier is not controlled, that is, is not fitted with automatic volume control, etc. The thyratron receives the first arrival signal through a lead 70 from the plate circuit of a tube 71 which is ahead of the controlled section of the amplifier. The plate circuit of the thyratron is connected to the last amplifier tube 60 through a lead 72. The thyratron plate current provides the expander effect, as described in connection with Fig. 7, by gradually reducing the negative bias on the grid of tube 31 due to battery 61; this opposing voltage being delivered through condenser 62 and resistor 63. If complete obviation in time lag in recording the first break is desired, circuits such as that of Fig. 5 are employed.

The invention has been described primarily in connection with reflection seismograph prospecting, but it is also useful in other types of geophysical prospecting such as refraction seismography. It is applicable to various types of amplifier circuits, including plain amplifiers and amplifiers provided with automatic volume or frequency control. It can be used with any of the usual detectors, responsive to amplitude, velocity or acceleration of seismic tremors, and any type of recorder including variable density recorders. Stages of amplification can be added or subtracted in the main circuit or in the auxiliary circuit as may be necessary to meet particular conditions.

What I claim is:

1. In combination, a seismograph signal amplifying circuit, an auxiliary bypass circuit around the seismograph signal amplifying circuit, including an amplifying device, means for coupling the input and the output of said device to the input portion and the output portion respectively of the amplifying circuit, said auxiliary bypass circuit being initially in operative condition for transmitting and amplifying signals from said input portion to said output portion of the signal amplifying circuit, means adapted on operation to render said device inoperative to transmit further signals and means for operating said last-named means after transmission of the first signal energy by the auxiliary circuit; whereby the first signal energy reaching the signal amplifying circuit is transmitted to the output of said circuit through the auxiliary circuit.

2. In a seismograph signal amplifying circuit having means for increasing the sensitivity of said circuit as a function of time from initial relatively low values to higher values, the improvement comprising an auxiliary circuit including an amplifying device, means for coupling the input and the output of said device to the amplifying circuit at points before and after the sensitivity increasing means respectively, means adapted on operation to render said device inoperative to transmit further signals and means for operating said means after transmission of the first signal through the auxiliary circuit.

3. In a seismograph signal amplifier circuit having means for increasing the amplifier circuit sensitivity as a function of time from initially low values to higher values, the improvement comprising an auxiliary circuit including a thyratron tube having cathode, grid and plate, a biased grid circuit for the thyratron tube connected to the amplifier circuit at a point before the sensitivity increasing means and adjusted to keep the grid bias beyond the value at which plate current flows in the tube, in the absence of signal energy applied to said auxiliary circuit, and a plate circuit for the tube coupled to the amplifier circuit at a point after said sensitivity increasing means; whereby on appearance of the first signal energy at the amplifying circuit a plate current is abruptly established in the thyratron and a current impulse is applied from said plate circuit to the amplifier circuit.

4. In a seismograph signal amplifying circuit and means in combination therewith for increasing the sensitivity of said amplifying circuit as a function of time from initially low values to higher values, the improvement comprising an amplifier tube and a thyratron tube, means for biasing the thyratron tube to a potential value preventing flow of plate current, means for applying the output of the amplifier tube to the thyratron tube in a direction to trip the tube, means for coupling the grid of the amplifier tube to the amplifying circuit at a point prior to the sensitivity increasing means and means for coupling the output of one of said tubes to the amplifying circuit at a point beyond said sensitivity increasing means, and means for applying plate current from the thyratron to the grid of the amplifier tube in a direction to block the amplifier tube.

5. In a seismograph signal amplifier circuit, a control tube adapted to adjust the gain of the amplifier circuit in response to potential applied to the control tube, an auxiliary circuit including a thyratron tube, means for connecting the input part of the amplifier circuit prior to said control tube, to the grid of the thyratron tube, and means for biasing the thyratron grid to a degree such that no plate current flows therein, means for connecting the output of the thyratron tube to the amplifier circuit beyond said control tube, a battery connected to the control tube, of such potential as to maintain the gain of the amplifier circuit low, and means for gradually applying plate current from the thyratron tube to the control tube in a direction tending to reduce the bias thereon.

6. In a seismograph system including in circuit a detector, an amplifier provided with an expander, and a recorder: an auxiliary circuit coupled at a point in circuit between the detector and the expander, and at a point in circuit between the expander and the recorder; said auxiliary circuit including means for transmitting signal energy from the first said point to the second, means adapted on actuation to render the transmitting means inoperative, and means for actuating said last-named means after the first half-cycle of wave energy has been transmitted by the transmitting means.

7. In combination with a seismograph amplifying and recording circuit including a seismograph signal amplifier, a recorder connected thereto, and sensitivity control means for the circuit constructed and arranged to increase the sensitivity of the circuit from an initial low value to higher values, an auxiliary amplifying circuit having its input side and output side coupled to said circuit on the input and output side respectively of said control means, said auxiliary circuit being initially operative to transmit signals, whereby signals are initially transmitted to the recorder at a sensitivity higher than said initial sensitivity of said amplifying and recording circuit alone, means adapted on operation to render said auxiliary circuit inoperative to transmit signals, and means for so operating said last-named means after transmission of the first signal energy through said auxiliary circuit.

RALPH D. WYCKOFF.